US012210309B2

(12) United States Patent
Kurita

(10) Patent No.: US 12,210,309 B2
(45) Date of Patent: Jan. 28, 2025

(54) IMAGE FORMING APPARATUS INCLUDING PLURALITY OF STATIONS PROVIDING IMPROVED ACCESS FOR MAINTENANCE OF THE IMAGE FORMING APPARATUS

(71) Applicant: CANON KABUSHIKI KAISHA, Tokyo (JP)

(72) Inventor: Shigeharu Kurita, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/475,339

(22) Filed: Sep. 27, 2023

(65) Prior Publication Data

US 2024/0134308 A1 Apr. 25, 2024
US 2024/0231268 A9 Jul. 11, 2024

(30) Foreign Application Priority Data

Oct. 24, 2022 (JP) ................................. 2022-170033

(51) Int. Cl.
| | |
|---|---|
| *G03G 15/00* | (2006.01) |
| *F16F 15/14* | (2006.01) |
| *G03G 21/16* | (2006.01) |
| *G03G 21/18* | (2006.01) |

(52) U.S. Cl.
CPC ....... *G03G 15/757* (2013.01); *F16F 15/1457* (2013.01); *G03G 21/1619* (2013.01); *G03G 21/1647* (2013.01); *G03G 21/1857* (2013.01); *F16F 2222/08* (2013.01);
(Continued)

(58) Field of Classification Search
CPC .. G03G 15/757; G03G 21/1619; G03G 15/80; G03G 21/1647; G03G 21/1652; G03G 21/1857; G03G 15/5008; G03G 2215/00978; F16F 15/1457; F16F 2222/08; F16F 2232/02; Y10T 74/2121
See application file for complete search history.

(56) References Cited

U.S. PATENT DOCUMENTS

| | | | |
|---|---|---|---|
| 9,651,913 B2 * | 5/2017 | Koshida | ............. G03G 15/6573 |
| 11,672,075 B2 * | 6/2023 | Hamasaki | ............ G03G 21/206 |
| | | | 399/92 |
| 2011/0299258 A1 | 12/2011 | Ishii | |

(Continued)

FOREIGN PATENT DOCUMENTS

JP 2011253021 A 12/2011

*Primary Examiner* — Arlene Heredia
*Assistant Examiner* — Laura Roth
(74) *Attorney, Agent, or Firm* — ROSSI, KIMMS & McDOWELL LLP

(57) ABSTRACT

An image forming apparatus includes: a plurality of stations and a plurality of stays arranged along a first direction; and a first board support member supporting a first electric board. Each of the plurality of stations includes: a rotation shaft extending in a second direction intersecting the first direction; and a photosensitive member and a flywheel provided to the rotation shaft. The first board support member is attached to two of the plurality of stays so as to bridge a gap between the two stays, and provided, in the second direction, on a first side opposite to a second side of the flywheel on which the photosensitive member is provided. The first board support member overlaps with the flywheel of at least one of the plurality of stations when viewed from a viewpoint along the second direction.

15 Claims, 13 Drawing Sheets

(52) U.S. Cl.
CPC ............... *F16F 2232/02* (2013.01); *G03G 2215/00978* (2013.01); *Y10T 74/2121* (2015.01)

(56) References Cited

U.S. PATENT DOCUMENTS

| | | | |
|---|---|---|---|
| 2013/0077986 A1* | 3/2013 | Mori .................. | G03G 21/1652 399/90 |
| 2015/0047459 A1* | 2/2015 | Miyawaki .......... | G03G 21/1647 74/574.4 |
| 2017/0261889 A1* | 9/2017 | Iwamoto ............ | G03G 15/1615 |

\* cited by examiner

IMAGE FORMING APPARATUS INCLUDING PLURALITY OF STATIONS PROVIDING IMPROVED ACCESS FOR MAINTENANCE OF THE IMAGE FORMING APPARATUS

BACKGROUND OF THE INVENTION

Field of the Invention

The present invention relates to an image forming apparatus.

Description of the Related Art

An image forming apparatus such as a copying machine, a printer, or a facsimile machine includes various electrical parts used in executing image forming processing. These electrical parts are mounted on an electric board, and the electric board is fixed to a support member such as a frame. US-2011-299258 discloses a configuration in which a plurality of frames are configured in layers and an electric board is attached to each frame. By configuring the plurality of frames in layers, the plurality of electric boards can be accommodated in the image forming apparatus without occupying a large area with respect to one surface constituting a main body of the image forming apparatus.

An image forming apparatus is required to be able to easily perform maintenance work on a component (part) such as an electric board. The maintenance work includes, for example, inspection and replacement of a component as a work target, for example, an electric board, replacement of a part mounted on the electric board, and the like. In order to facilitate the maintenance work on the component that is a work target, it is necessary to configure the image forming apparatus such that access to the component is easy. Note that access to a component includes making the component visually observable, in addition to physically accessing the component. In the configuration of US-2011-299258, access to an electric board on a front side with respect to the surface of the image forming apparatus to which the plurality of frames are attached is easy. However, in order to access an electric board on a rear side, the electric boards should be removed in order from the front side, so it is not easy to access the electric board on the rear side.

SUMMARY OF THE INVENTION

The present invention is to provide an image forming apparatus for which it is possible to easily perform maintenance work.

According to an aspect of the present disclosure, an image forming apparatus includes: a plurality of stations arranged along a first direction; a plurality of stays arranged along the first direction; a first electric board, on which an electrical part is mounted; and a first board support member supporting the first electric board. Each of the plurality of stations includes: a rotation shaft extending in a second direction intersecting the first direction; a photosensitive member configured to rotate together with the rotation shaft; a flywheel provided to the rotation shaft; and a drive motor configured to rotate the rotation shaft. Each of the plurality of stays extends in a third direction intersecting the first direction and the second direction, the first board support member is attached to two of the plurality of stays so as to bridge a gap between the two of the of the plurality of stays, the first board support member is, in the second direction, provided on a first side of the flywheel, the first side being opposite to a second side of the flywheel on which the photosensitive member is provided, and the first board support member overlaps with the flywheel of at least one of the plurality of stations when viewed from a viewpoint along the second direction.

Further features of the present invention will become apparent from the following description of exemplary embodiments with reference to the attached drawings.

DESCRIPTION OF THE EMBODIMENTS

Figure 1:
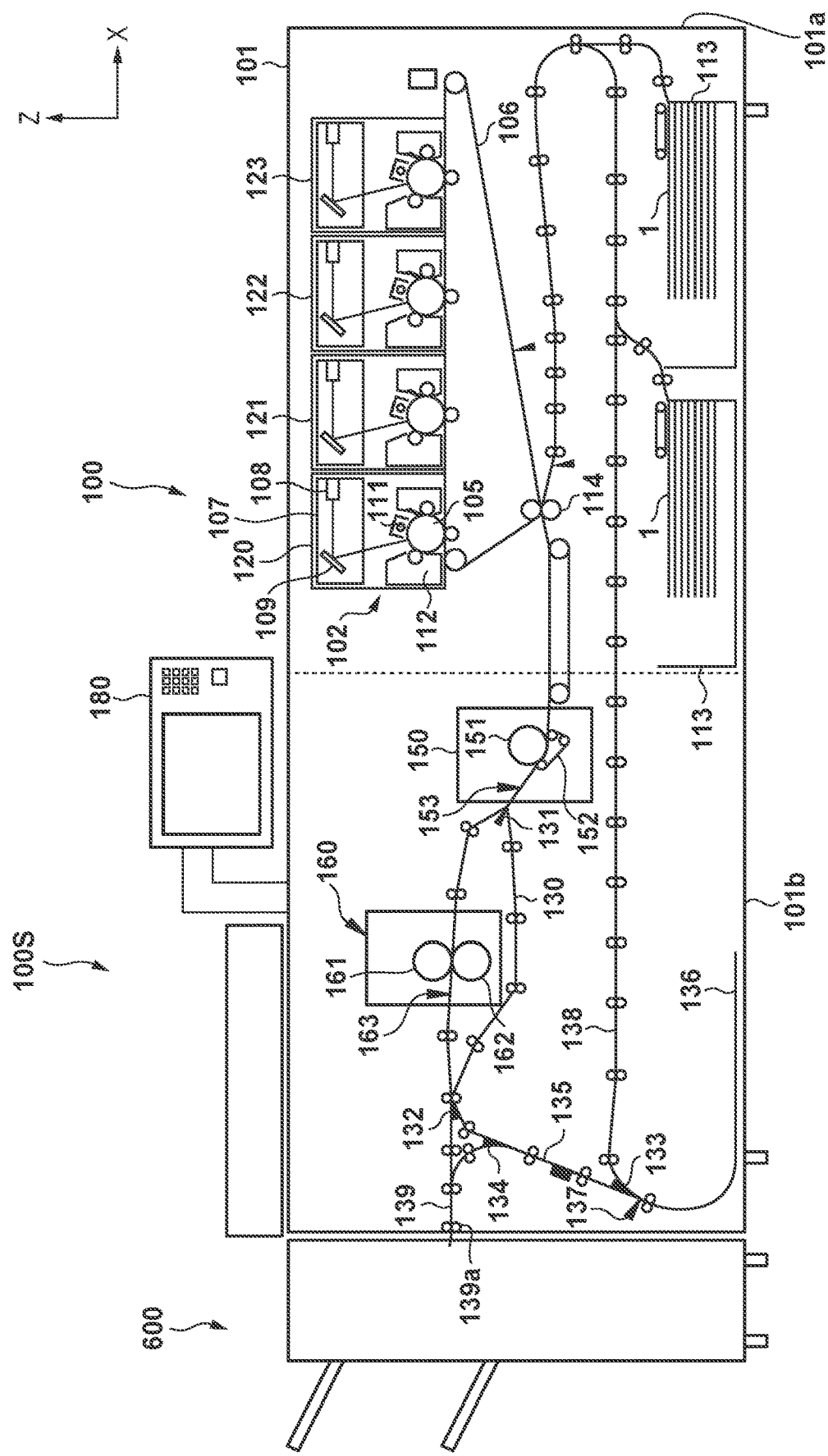
FIG. 1 is a schematic cross-sectional view of an image forming system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 is a configuration view of an image forming system 100S according to the present embodiment. Note that in order to facilitate understanding of a structure illustrated in each of the following drawings, three directions (an X direction, a Y direction, and a Z direction) orthogonal to each other or two directions among them are illustrated in each drawing. The Z direction of the three directions corresponds to the vertical direction (top-bottom direction). In the following description, the X direction is also referred to as a width direction, and the Y direction is also referred to as a depth direction. In addition, in each drawing, a Z direction is an upward direction, and a −Z direction is a downward direction.

Figure 2:
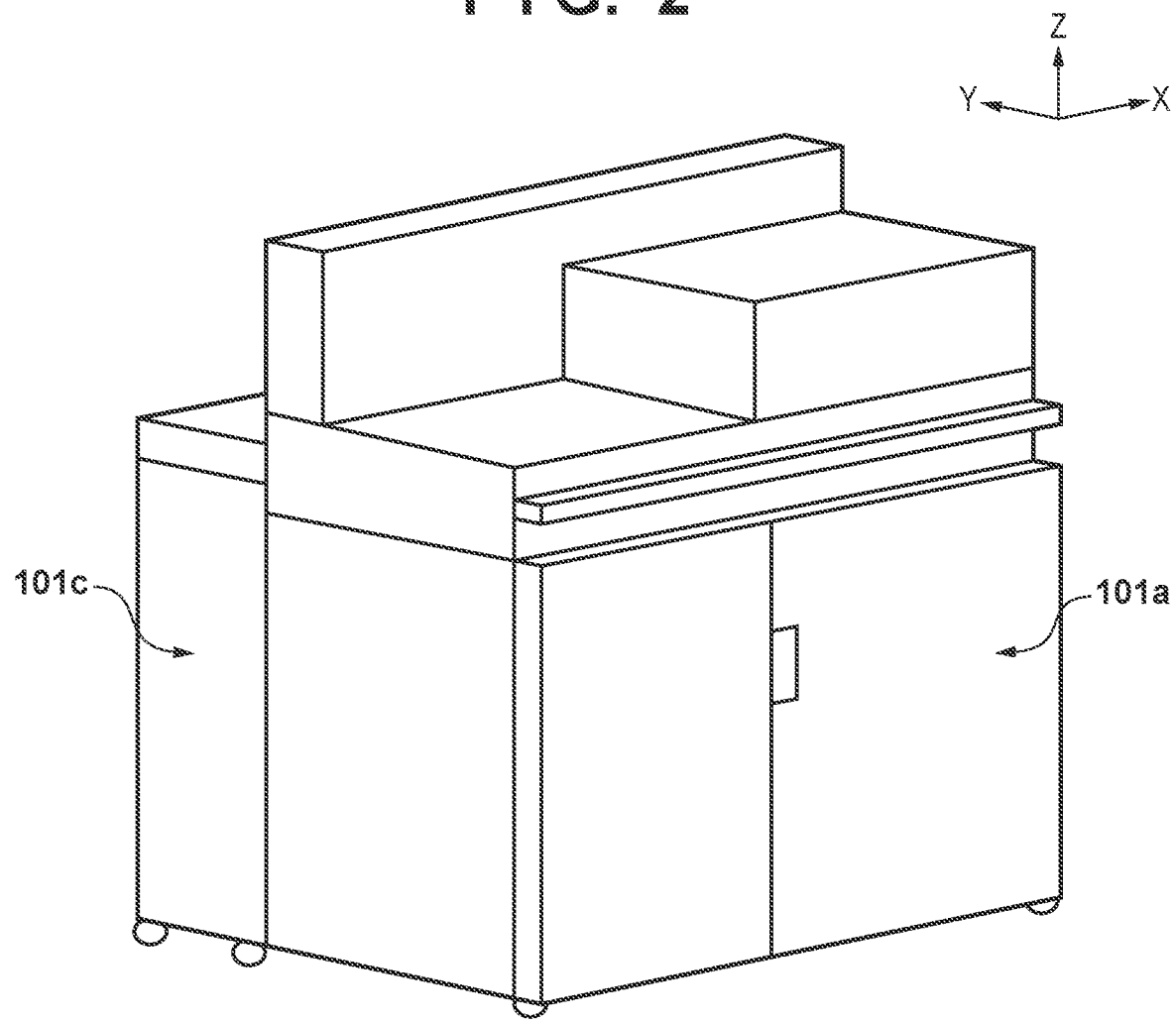
FIG. 2 is a perspective view illustrating a first housing and a third housing.

The image forming system 100S includes an image forming apparatus 100 and a finisher 600. A housing 101 of the image forming apparatus 100 includes a first housing 101a, a second housing 101b, and a third housing 101c (refer to FIG. 2). As illustrated in FIG. 1, the first housing 101a and the second housing 101b are arranged along the width direction. In addition, as illustrated in FIG. 2, the first housing 101a and the third housing 101c are arranged along the depth direction. The first housing 101a includes an image forming engine 102, an intermediate transfer belt 106, and a stocker 113. The second housing 101b includes a first fixing device 150 and a second fixing device 160. Note that the first housing 101a and the second housing 101b also include members configured to convey a sheet 1, for example, a conveyance path of the sheet 1, a roller configured to convey the sheet 1 along the conveyance path, and the like. The third housing 101c includes a power supply unit that generates and supplies each voltage used in the image forming system 100S based on an AC power supply from the outside.

The image forming engine 102 includes stations 120 to 123 that form toner images of yellow, magenta, cyan and black. The stations 120 to 123 are arranged along the width direction. Each of the stations 120 to 123 has the same configuration. When forming an image, a photosensitive member 105 is rotationally driven in counterclockwise direction in the drawing, and the intermediate transfer belt 106 is rotationally driven in clockwise direction in the drawing. A charger 111 charges a surface of the photosensitive member 105. An exposure unit 107 forms an electrostatic latent image on the photosensitive member 105 by exposing the photosensitive member 105 based on image data. The exposure unit 107 includes a light source 108 that emits light, and a deflector 109 that deflects the light emitted by the light source 108 toward the photosensitive member 105.

A developing device 112 forms a toner image on the photosensitive member 105 by developing the electrostatic latent image on the photosensitive member 105 with a developing voltage. The toner images formed on each of the photosensitive members 105 are transferred to the intermediate transfer belt 106. Colors different from yellow, magenta, cyan, and black can be reproduced by superimposing and transferring the toner images of each of the photosensitive members 105 onto the intermediate transfer belt 106. The toner images transferred onto the intermediate transfer belt 106 are conveyed to a position facing a transfer roller 114 by rotation of the intermediate transfer belt 106.

On the other hand, a sheet 1 stored in the stocker 113 is fed to the conveyance path, and conveyed toward the position where the transfer roller 114 and the intermediate transfer belt 106 face each other. The transfer roller 114 transfer the toner images on the intermediate transfer belt 106 to the sheet 1. The sheet 1 having the toner images transferred thereon is conveyed to the first fixing device 150. The first fixing device 150 performs first fixing processing for fixing the toner images on the sheet 1. The first fixing device 150 includes a fixing roller 151 that heats the sheet 1, a pressure belt 152 that brings the sheet 1 into pressure contact with the fixing roller 151, and a first post-fixing sensor 153 that detects completion of the first fixing processing.

The second fixing device 160 is arranged on a further downstream side from the first fixing device 150 in the conveyance path of the sheet 1. The second fixing device 160 performs second fixing processing for increasing glossiness of the image subjected to the first fixing processing and securing fixability of the image to the sheet 1. The second fixing device 160 includes a fixing roller 161 and a pressing roller 162 configured to heat and press the sheet 1, and a second post-fixing sensor 163 that detects completion of the second fixing processing. Note that the second fixing processing is not required depending on a type of the sheet 1. When the second fixing processing is not required, the sheet 1 is conveyed along a bypass conveyance path 130. A flap 131 is provided in order to switch between guiding the sheet 1 to the second fixing device 160 or guiding the sheet 1 to the bypass conveyance path 130.

The sheet 1 passed through the second fixing device 160 or the bypass conveyance path 130 is guided to either a discharge conveyance path 139 or a reversal conveyance path 135 by a flap 132. For example, when an image is formed on only one side of the sheet 1 and the sheet 1 is discharged with the surface, on which the image is formed, facing up, the sheet 1 on one side of which the image is formed is guided to the discharge conveyance path 139. When images are formed on both sides of the sheet 1, the sheet 1 on both sides of which the images have been formed is guided to the discharge conveyance path 139. On the other hand, when an image is formed on only one side of the sheet 1 and the sheet 1 is discharged with the surface, on which the image is formed, facing down, the sheet 1 on one side of which the image is formed is guided to the reversal conveyance path 135. Further, when images are formed on both sides, the sheet 1 having an image being formed on one side is guided to the reversal conveyance path 135. The sheet 1 conveyed to the reversal conveyance path 135 is conveyed to a reversal unit 136, and the conveyance direction of the sheet 1 is switched by a switchback operation performed by the reversal unit 136. Note that a timing at which the reversal unit 136 performs the switchback operation is determined based on a detection result of the sheet 1 by a sensor 137.

When printing on both sides of the sheet 1 is performed, the sheet 1 having an image being formed on one side is conveyed again toward the position facing the transfer roller 114, via a re-conveyance path 138. When an image is formed on only one side of the sheet 1 and the sheet 1 is discharged with the surface, on which the image is formed, facing down, the sheet 1 is conveyed to the discharge conveyance path 139 via the reversal conveyance path 135. A flap 133 is provided in order to switch between guiding the sheet 1 on the reversal unit 136 to the re-conveyance path 138 or guiding the sheet to the reversal conveyance path 135. In addition, a flap 134 is provided in order to guide the sheet 1 conveyed from the reversal unit 136 to the reversal conveyance path 135 toward the discharge conveyance path 139. The sheet 1 guided to the discharge conveyance path 139 is sent to the finisher 600 by a discharge roller 139a. The finisher 600 performs post-processing such as punching processing and binding processing in accordance with a user setting. Finally, the sheet 1 is stacked on a tray of the finisher 600, as a product. An operation unit 180 provides a user interface for a user to control the image forming system 100S.

Figure 3:
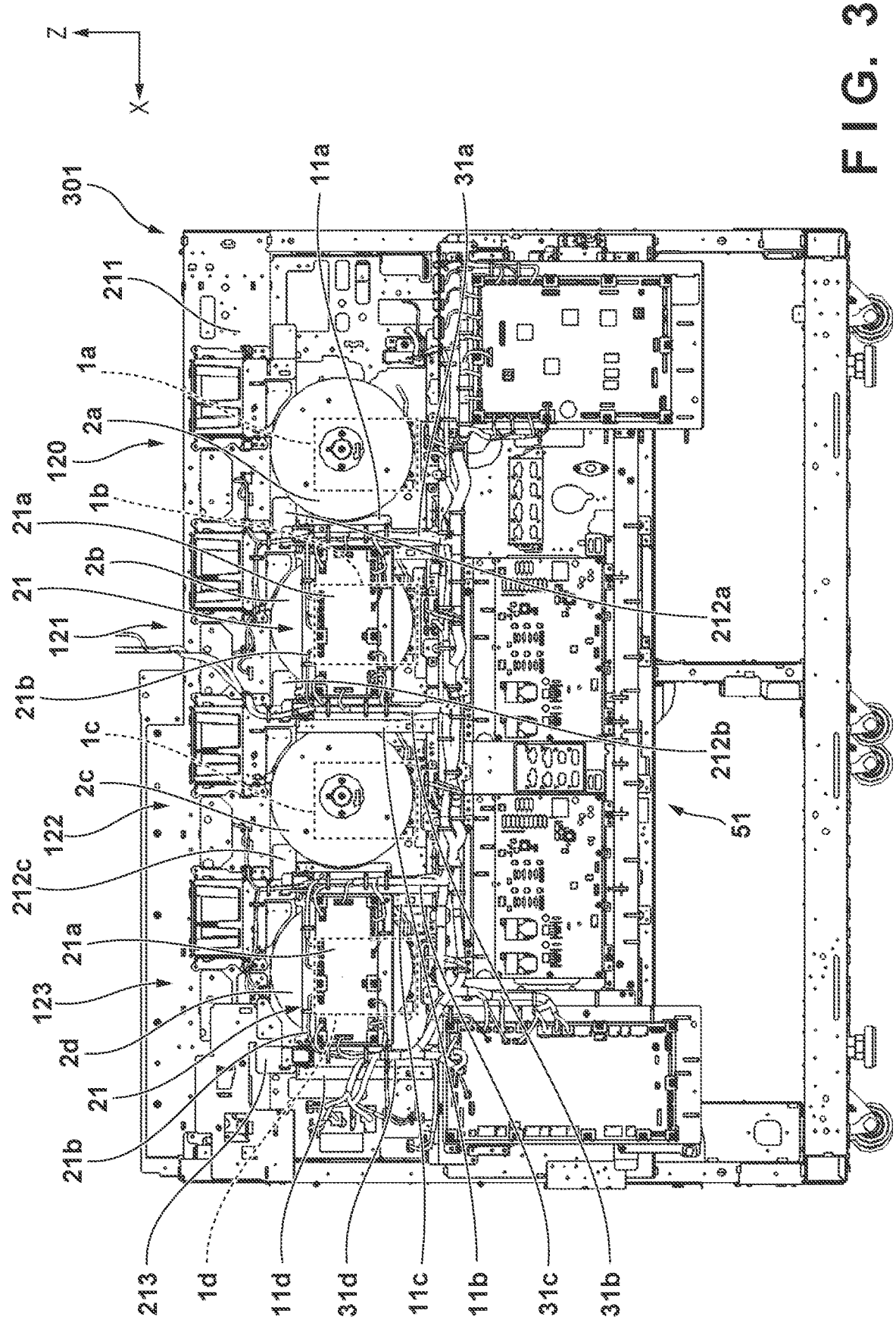
FIG. 3 is a view illustrating an inside of the first housing viewed from a back side.

FIG. 3 is a view illustrating an inside of the first housing 101a viewed from the third housing 101c side. Specifically, FIG. 3 is illustrating a state in which the third housing 101c is separated from the first housing 101a and a rear surface cover on the third housing 101c side of the first housing 101a is removed. Hereinafter, the side of the first housing 101a on which the rear surface cover is provided is referred to as a "back side." The first housing 101a includes a rear side plate 211 made of sheet metal constituting a frame body 301 of the first housing 101a. Drive units 1a to 1d configured to rotationally drive the respective photosensitive members 105 of the stations 120 to 123 are fixed to the rear side plate 211. Flywheels 2a to 2d configured to suppress rotation unevenness of the photosensitive members 105 are attached to the drive units 1a to 1d. The flywheels 2a to 2d suppress rotation unevenness of the photosensitive members 105 by their own inertia.

Since the configurations of the drive units 1a to 1d and the flywheels 2a to 2d of the respective stations 120 to 123 are the same as each other, the configuration of the drive unit 1*a* and the flywheel 2*a* of the yellow station 120 will be described in detail below with reference to FIGS. 4 and 5.

Figure 4:
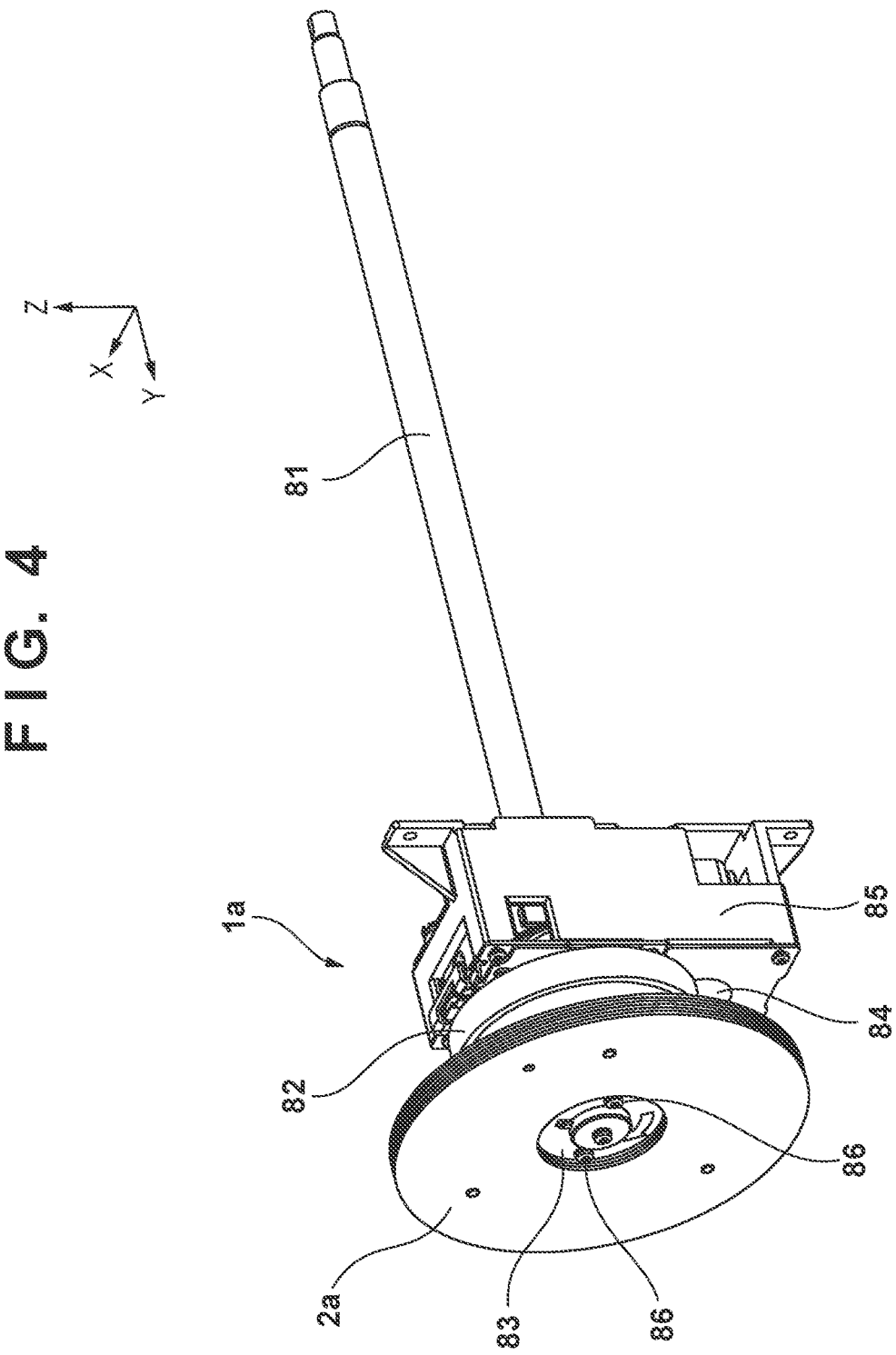
FIG. 4 is a schematic perspective view of a drive unit and a flywheel.
Figure 5:
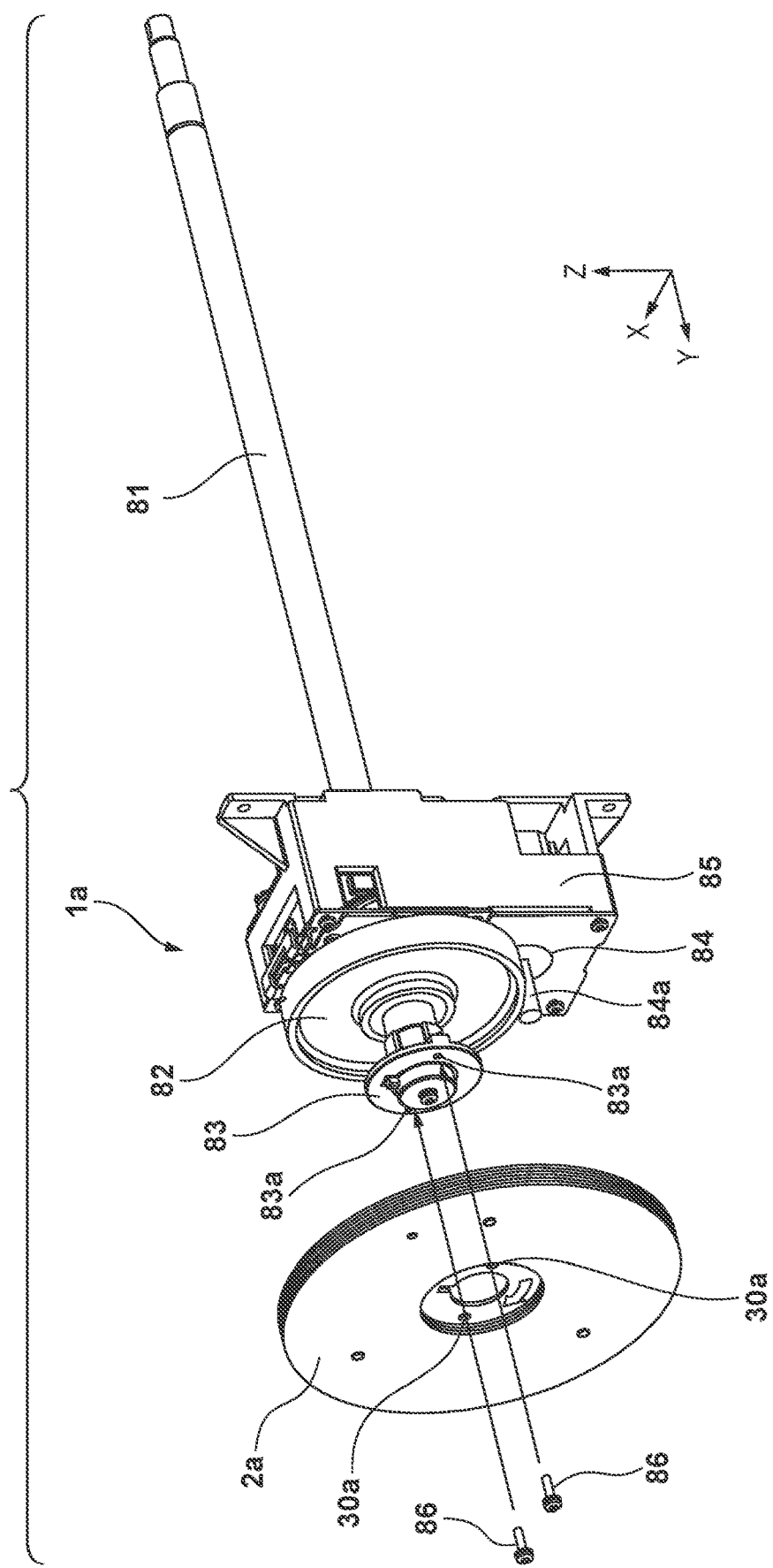
FIG. 5 is an exploded view of FIG. 4.

FIG. 4 is illustrating a state in which the flywheel 2*a* is attached to the drive unit 1*a*, and FIG. 5 is illustrating a state before the flywheel 2*a* is attached to the drive unit 1*a*. The drive unit 1*a* includes a drive support 85 and a drive motor 84 supported by the drive support 85. The drive motor 84 is a drive source configured to rotate a rotation shaft 81 attached to the photosensitive member 105. A drum gear 82 and a flange 83 are fixed to an end portion of the rotation shaft 81 different from that on a side on which the photosensitive member 105 is attached. The flange 83 is provided with two screw holes 83*a*. In addition, the flywheel 2*a* is provided with two through-holes 30*a*. The flywheel 2*a* is attached to the drive unit 1*a* by fastening two screws 86 to the respective screw holes 83*a* of the flange 83 through the through-holes 30*a* of the flywheel 2*a*. A pinion gear 84*a* of the drive motor 84 is in mesh with the drum gear 82, and the rotation shaft 81 rotates in accordance with rotation of the drive motor 84, whereby the flywheel 2*a* and the photosensitive member 105 rotate.

Referring back to FIG. 3, stays 11*a* to 11*d* are fixed to respective left sides of the flywheels 2*a* to 2*d*, as viewed from the back side, by a method described below. The stays 11*a* to 11*d* can function as support members for the frame body 301 of the first housing 101*a*. The stays 11*a* to 11*d* are arranged along the width direction and each have a shape extending in the vertical direction. Below the flywheels 2*a* to 2*d*, an electric unit 51 described below is fixed to the rear side plate 211 through a support member (not illustrated).

Figure 6:
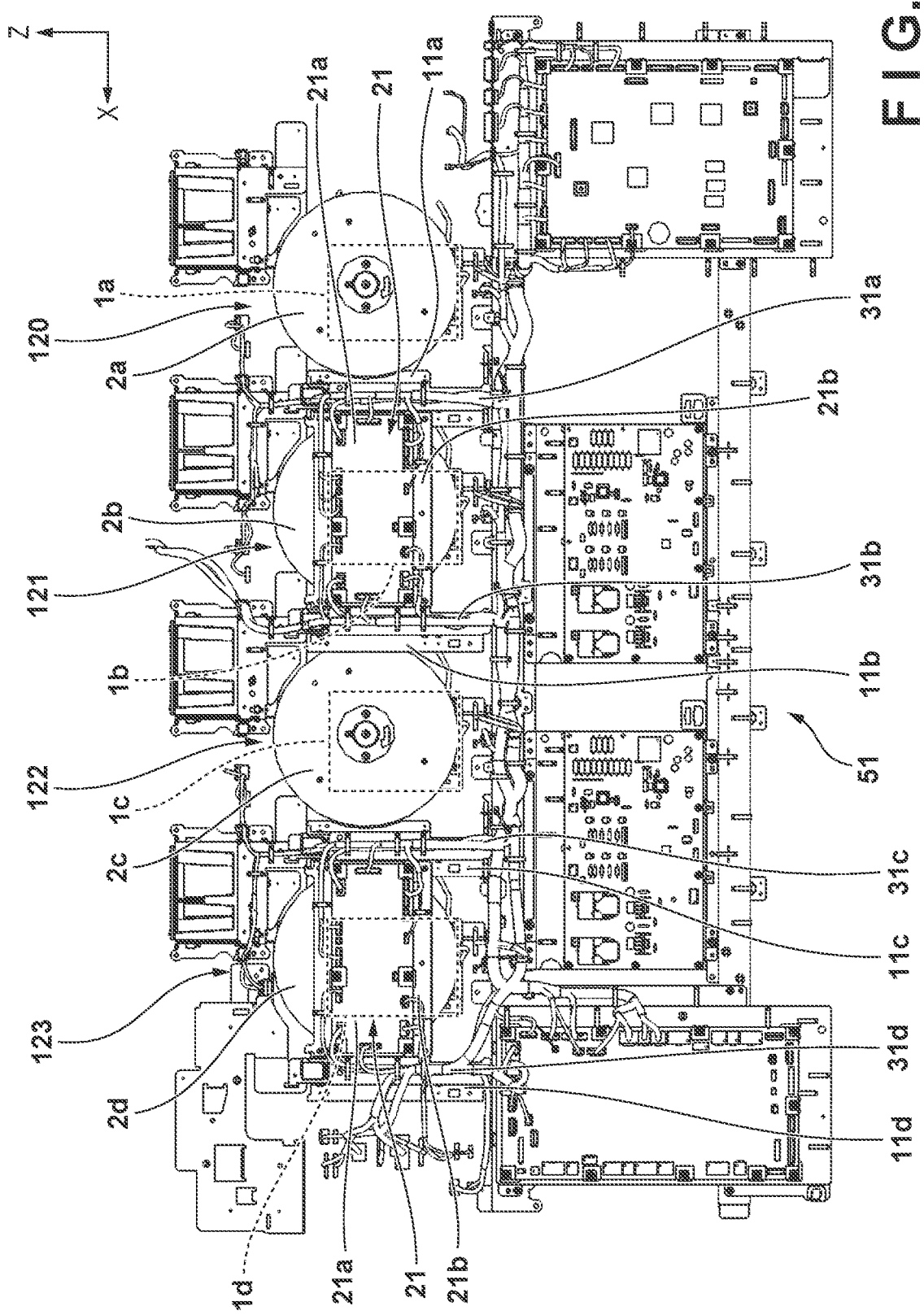
FIG. 6 is a peripheral view of flywheels of FIG. 3.

FIG. 6 is illustrating a part near the flywheels 2*a* to 2*d* of FIG. 3. A drive board unit 21 configured to drive the drive units 1*a* and 1*b* is arranged between the stays 11*a* and 11*b* adjacent to each other in the width direction. Similarly, a drive board unit 21 configured to drive the drive units 1*c* and 1*d* is arranged between the stays 11*c* and 11*d* adjacent to each other in the width direction. The drive board unit 21 includes a drive board 21*a* that is an electric board on which electrical parts such as electronic parts are mounted, and a drive board support plate 21*b* that is a board support member that supports the electric board. One of the two drive board support plates 21*b* is attached by a screw or the like bridging a gap between the stay 11*a* and the stay 11*b*, and the other is attached by a screw or the like bridging a gap between the stay 11*c* and the stay 11*d*. The drive board 21*a* is attached to a back side of the drive board support plate 21*b* by a screw or the like. Note that a position of the drive board support plate 21*b* in the depth direction in a state of being attached to the stays 11*a* to 11*d* is a position on an opposite side to a position where the photosensitive members 105 are provided with respect to the flywheels 2*a* to 2*d*. That is, an attachment position of the drive board support plate 21*b* in the depth direction is a position closer to the back side than the flywheels 2*a* to 2*d*.

The drive board 21*a* of the drive board unit 21 between the stays 11*a* and 11*b* is connected to the drive units 1*a* and 1*b* by electric cables 31*a* and 31*b*. The drive board 21*a* supplies drive signals for driving the drive motors 84 of the drive units 1*a* and 1*b* via the electric cables 31*a* and 31*b*. Similarly, the drive board 21*a* of the drive board unit 21 between the stays 11*c* and 11*d* is connected to the drive units 1*c* and 1*d* by electric cables 31*c* and 31*d*. The drive board 21*a* supplies drive signals for driving the drive motors 84 of the drive units 1*c* and 1*d* via the electric cables 31*c* and 31*d*. An electrical part configured to generate a drive signal is mounted on the drive board 21*a*. In the present embodiment, the drive board 21*a* supplies drive signals to the two drive units. A cable configured to supply a drive signal to one drive unit is passed to one of two stays supporting the drive board support plate 21*b* via the drive board support plate 21*b* to which the drive board 21*a* is attached, and a cable configured to supply a drive signal to the other drive unit is passed to the other stay. The electric cables 31*a* to 31*d* are arranged and wired in the vertical direction along the stays 11*a* to 11*d*, respectively.

Figure 7:
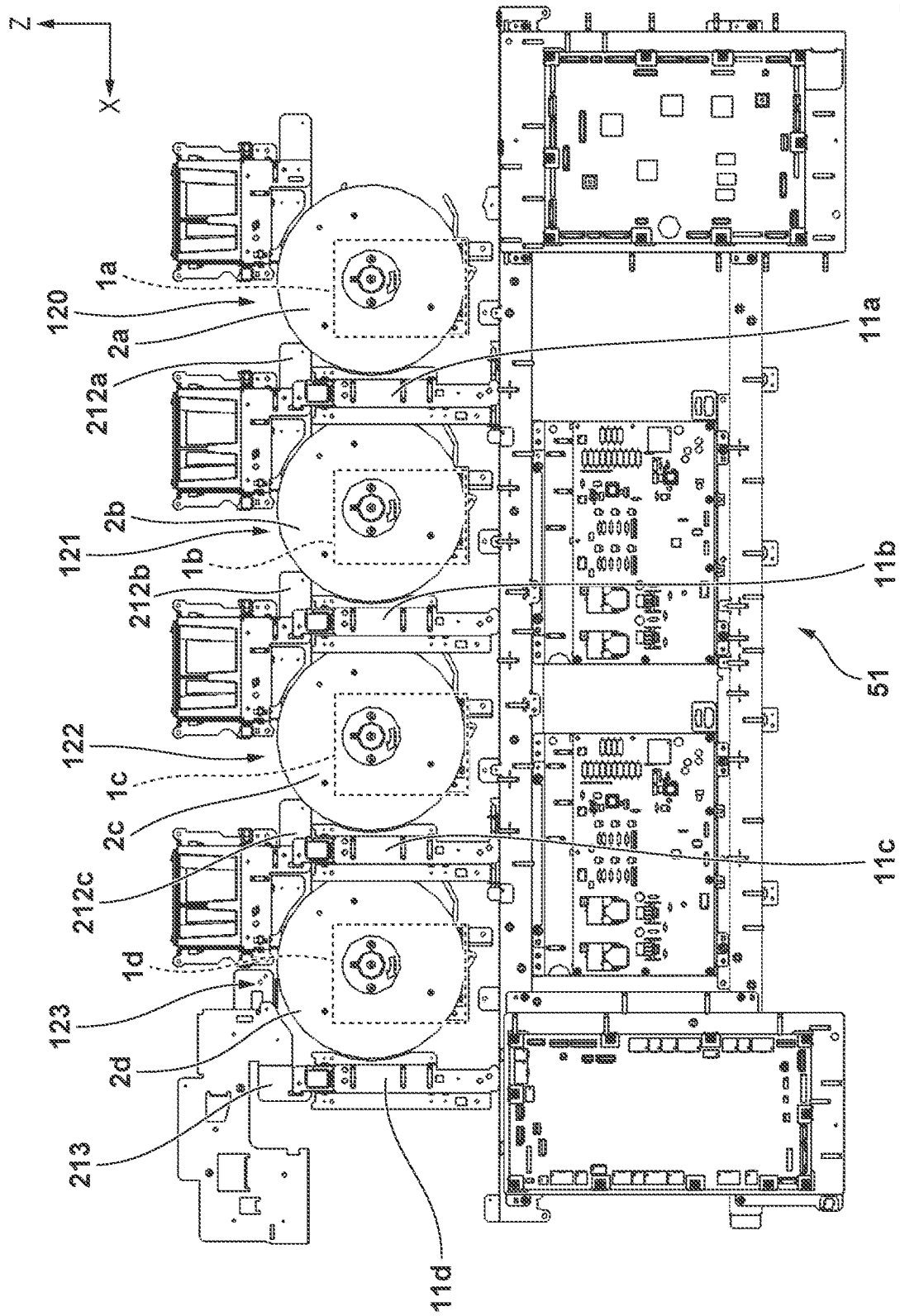
FIG. 7 is a view illustrating a state in which electric cables and drive board units of FIG. 6 are removed.

FIG. 7 is illustrating a state in which the electric cables 31*a* to 31*d* and the drive board units 21 are removed from FIG. 6. As illustrated in FIG. 7, when viewed from a viewpoint along a direction opposite to the Y direction from the back side, the stays 11*a* to 11*c* include regions overlapping the flywheels 2*b* to 2*d*. Note that the description "an object B includes a region (overlapping region) overlapping an object C when viewed from a viewpoint along the Y direction (or a viewpoint along a direction opposite to the Y direction)" means that the coordinates excluding the Y axis in the coordinates of the three dimensional region where the object B exists, i.e., the coordinates in the XZ plane, and the coordinates excluding the Y axis in the coordinates of the three dimensional region where the object C exists, i.e., the coordinates in the XZ plane include the same coordinates.

Figure 8:
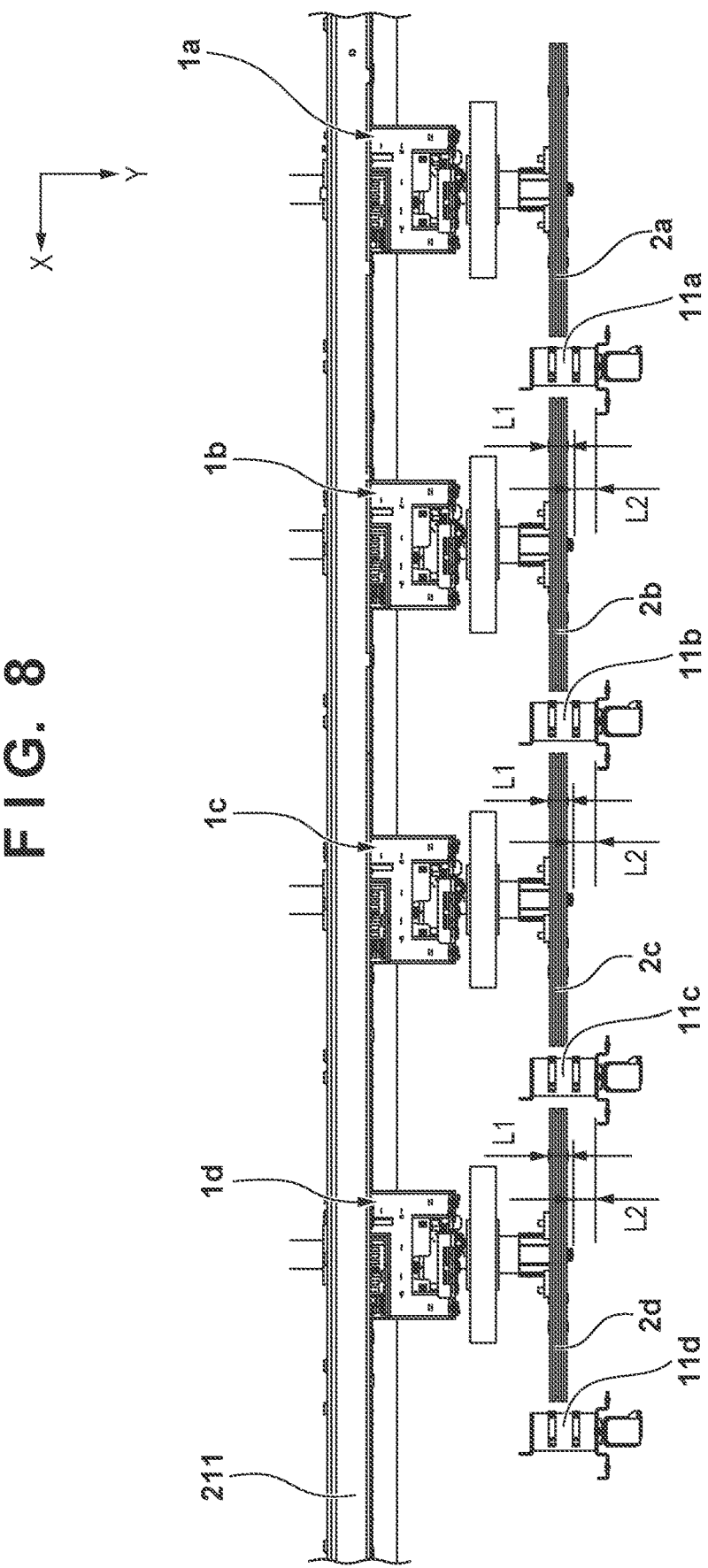
FIG. 8 is a top view of the first housing of FIG. 7.

FIG. 8 is illustrating a state viewed from the upper side of FIG. 7. Note that in FIG. 8, upper common supports 212*a* to 212*c* and an upper single support 213 of FIG. 7 are not illustrated. In FIG. 8, a distance L1 is a moving distance in the depth direction of the flywheels 2*a* to 2*d* required to remove the flywheels 2*a* to 2*d*. In addition, in FIG. 8, a distance L2 is a distance (interval) in the depth direction between the flywheels 2*b* to 2*d* and regions of the stays 11*a* to 11*c* overlapping the flywheels 2*b* to 2*d* when viewed from the back side. In the present embodiment, L2 is greater than L1. Therefore, as illustrated in FIG. 7, when viewed from the back side, a portion of the flywheels 2*b* to 2*d* is covered by a region of a portion of the stays 11*a* to 11*c*, but the flywheels 2*a* to 2*d* can be attached and detached without removing the stays 11*a* to 11*d*. That is, the stays 11*a* to 11*d* do not interfere with the flywheels 2*a* to 2*d*, and the flywheels 2*a* to 2*d* can be accessed without removing the stays 11*a* to 11*d*.

Figure 9:
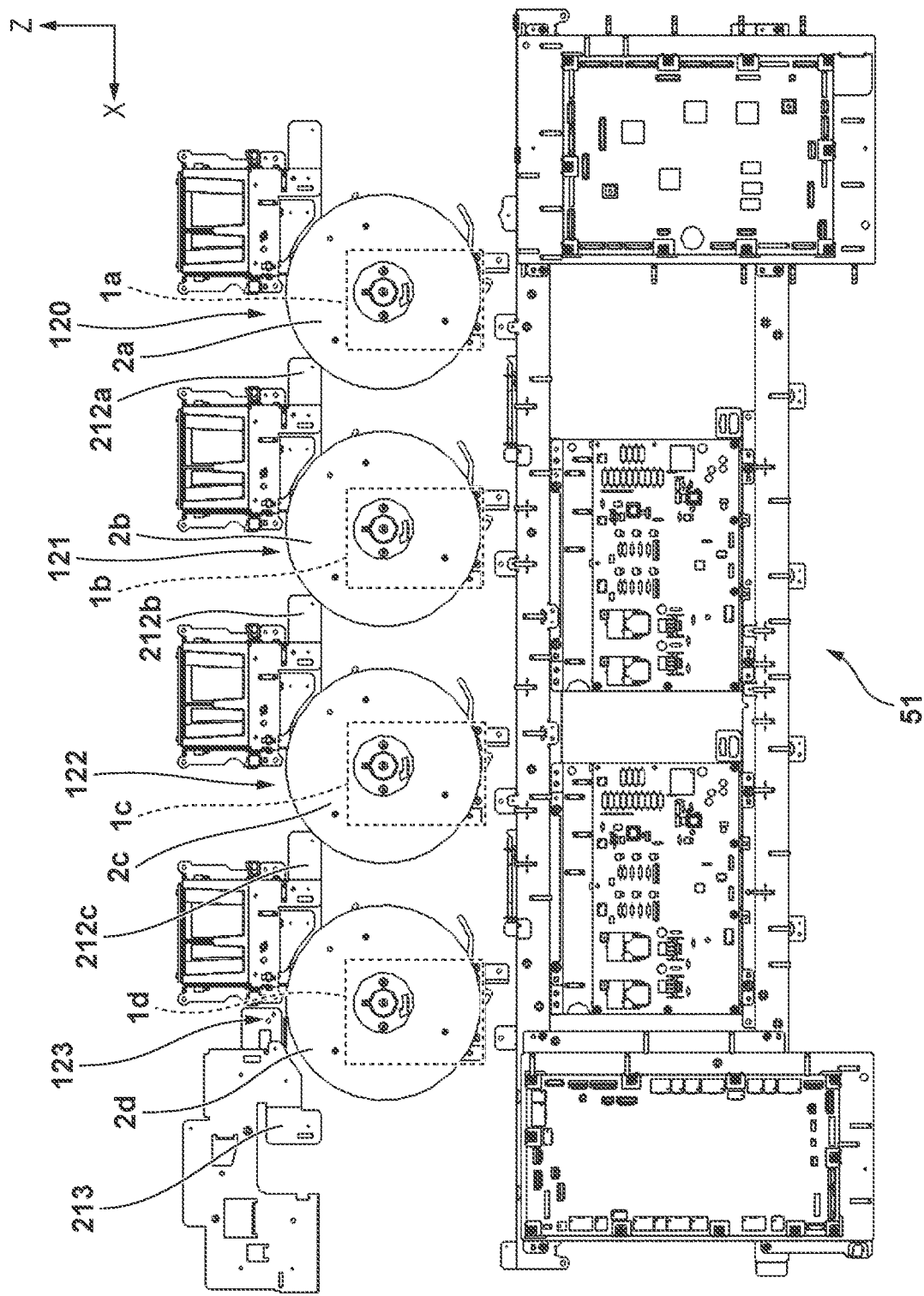
FIG. 9 is a view illustrating a state in which stays of FIG. 7 are removed.

FIG. 9 is illustrating a state in which the stays 11*a* to 11*d* of FIG. 7 are removed. As illustrated in FIG. 9, by removing the stays 11*a* to 11*d*, it is possible to access each of electric boards of the electric unit 51 described below, and therefore, to perform maintenance work on the electric unit 51 and the components of the electric unit 51.

Figure 10:
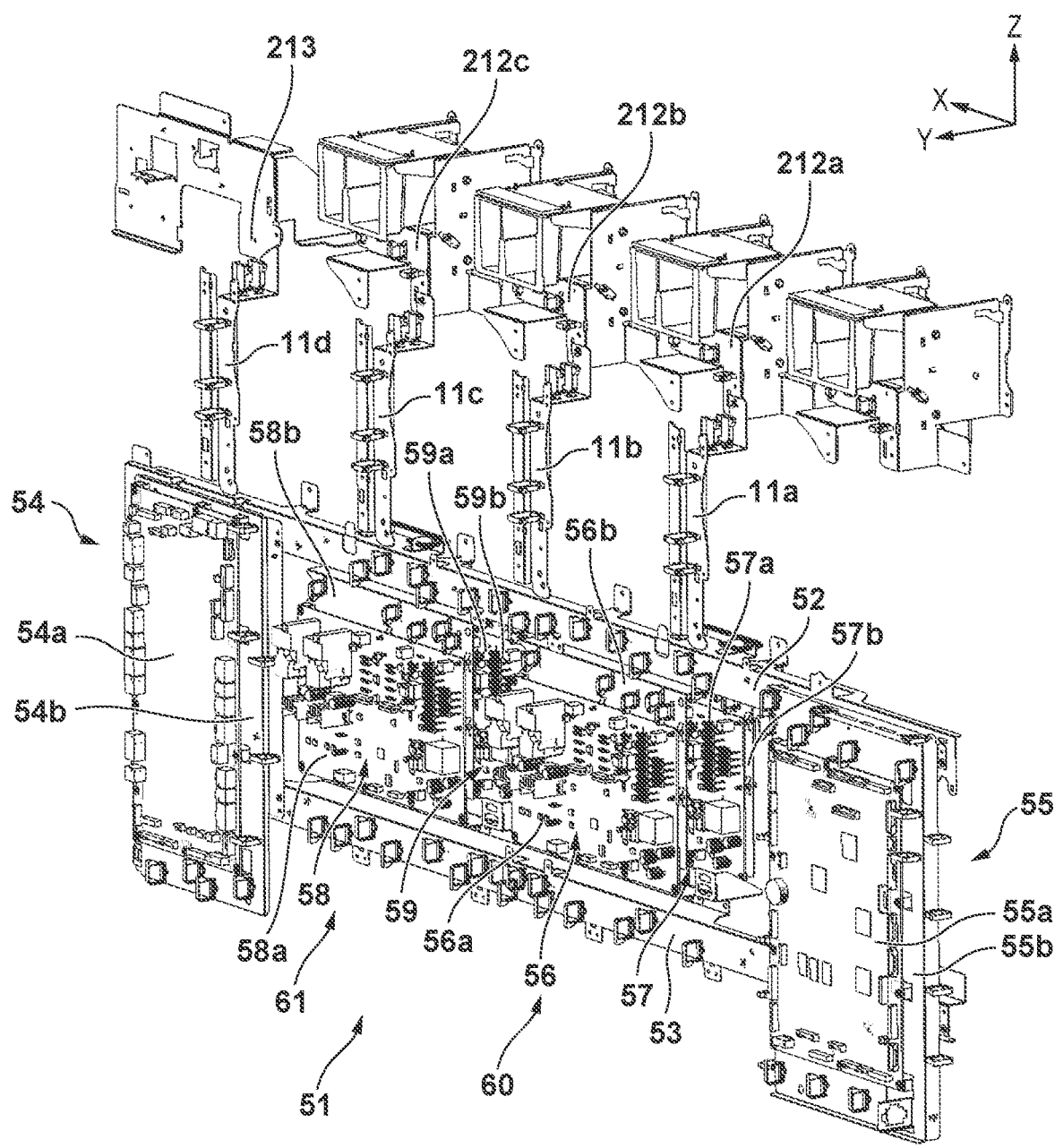
FIG. 10 is a schematic perspective view of the periphery of electric units of the first housing.

Next, an attachment configuration of the stays 11*a* to 11*d* will be described with reference to FIGS. 10 to 13. FIG. 10 is a schematic perspective view of the periphery of the stays 11*a* to 11*d*. In order to make the drawing easy to see, the flywheels 2*a* to 2*d* are not illustrated in FIG. 10. The stays 11*a* to 11*d* are attached, at upper portions thereof, to the upper common supports 212*a* to 212*c* and the upper single support 213. In addition, the stays 11*a* to 11*d* are attached, at lower portions thereof, to the electric unit 51. Note that the upper common supports 212*a* to 212*c* and the upper single support 213 are attached to the rear side plate 211 and constitute the frame body 301 of the first housing 101*a*.

Figure 11:
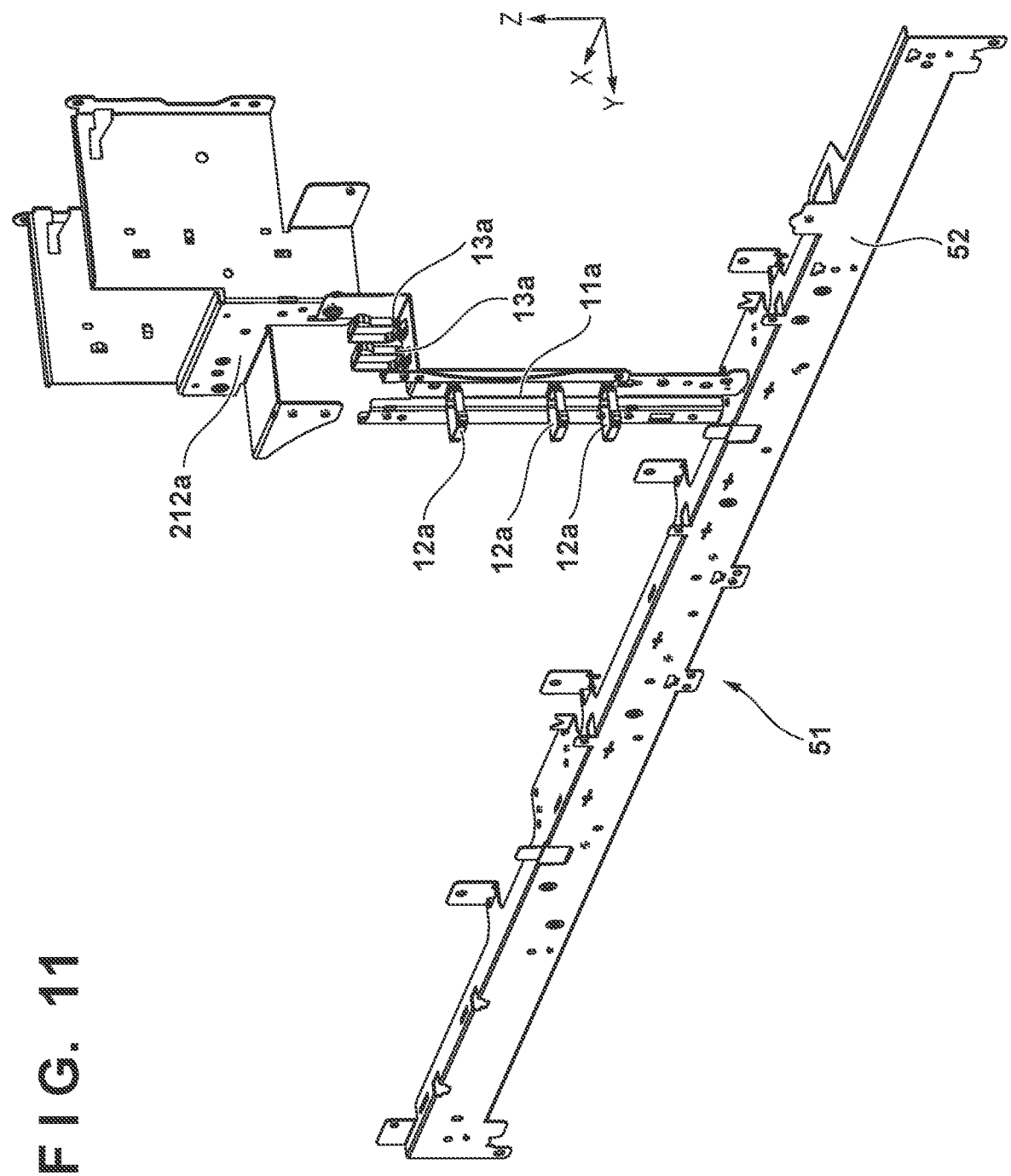
FIG. 11 is a view illustrating a state in which a stay is attached.

Since the attachment configurations of the stays 11*a* to 11*d* are the same, hereinafter, the attachment configuration of the stay 11*a* will be described in detail with reference to FIG. 11. An upper stay 52 in FIG. 11 is one of the parts/members constituting the electric unit 51.

Figure 12:
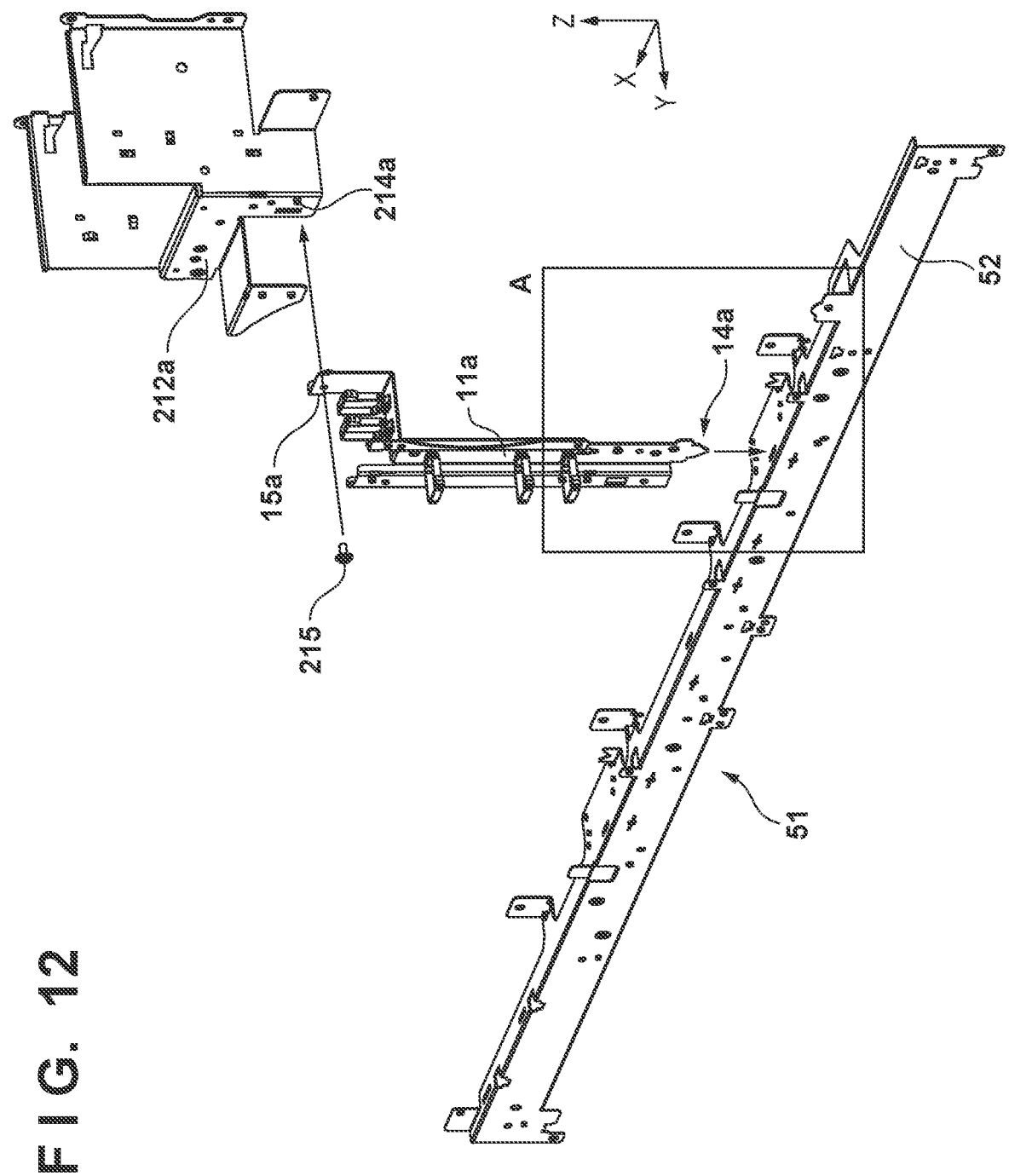
FIG. 12 is an exploded view of FIG. 11.

FIG. 12 is illustrating a state before the stay 11*a* is attached to the upper common support 212*a* and the upper stay 52. As illustrated in FIG. 12, the upper portion of the stay 11a is provided with a screw fitting hole 15a. The upper common support 212a is provided with a screw hole 214a. As will be described below with reference to FIG. 13, first, a lower end 14a of the stay 11a is inserted into a stay-attaching hole 52a of the upper stay 52, and then a screw 215 is fastened to the screw hole 214a of the upper common support 212a through the screw fitting hole 15a of the stay 11a. As a result, the upper portion of the stay 11a are fixed to the upper common support 212a.

Figure 13:
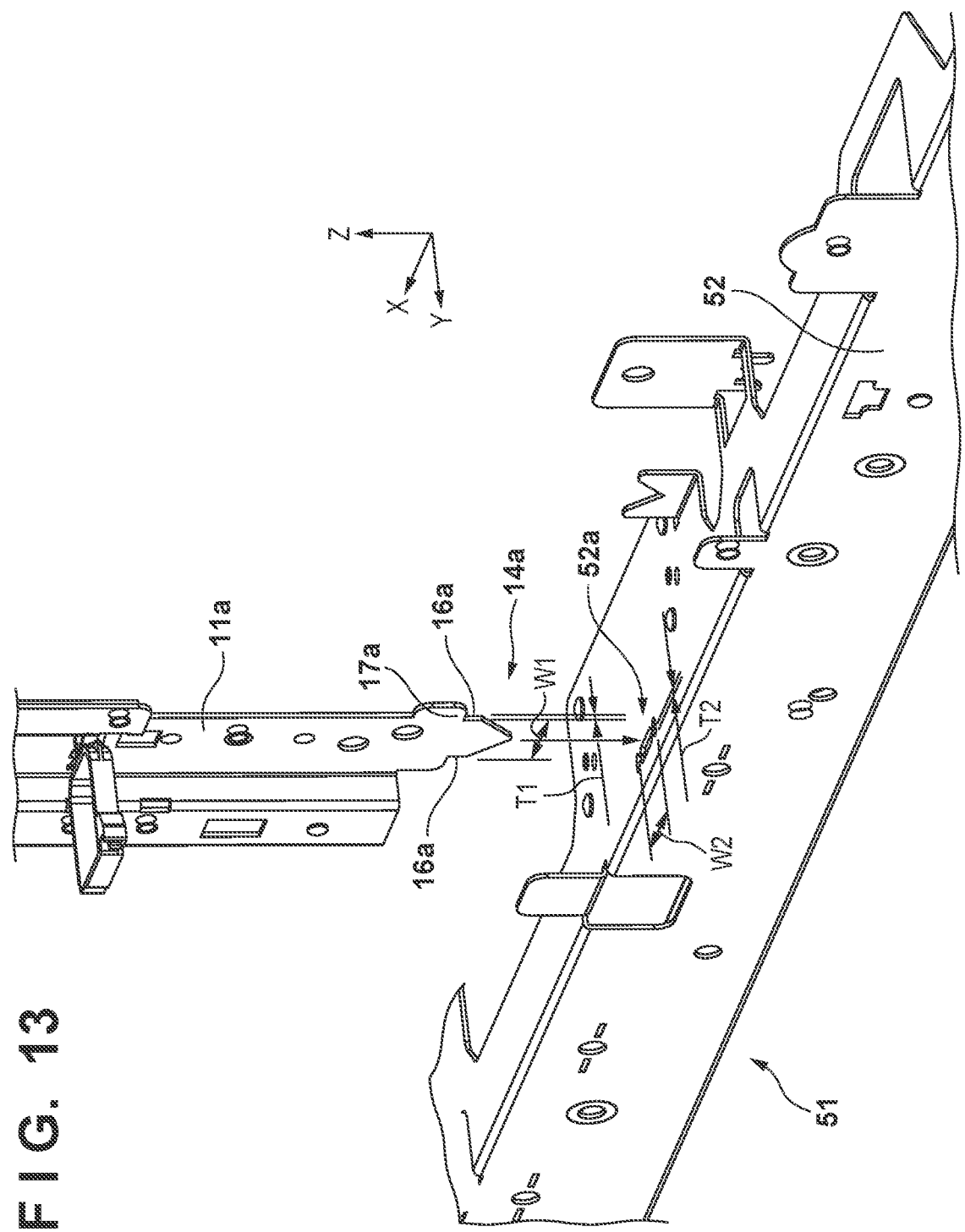
FIG. 13 is an enlarged view of a region A of FIG. 12.

FIG. 13 is an enlarged view of a region A of FIG. 12. As illustrated in FIG. 13, the lower end 14a of the stay 11a includes two vertical portions 16a extending in the vertical direction. A width (length in the width direction) between the two vertical portions 16a is W1. The lower end 14a has a tapered shape that becomes narrower in width from the lowermost portions of the two vertical portions 16a toward a lower portion in the vertical direction. A length in the depth direction (Y direction) of the lower end 14a is a thickness T1. In addition, an upper portion of the lower end 14a is provided with a convex portion 17a wider in width than the lower end 14a. Further, an upper side of the upper stay 52 is provided with a stay-attaching hole 52a. A width and a thickness of the stay-attaching hole 52a are W2 and T2, respectively. Note that the width W1 and thickness T1 of the lower end 14a and the width W2 and thickness T2 of the stay-attaching hole 52a are set such that the lower end 14a is fitted into the stay-attaching hole 52a. The stay 11a is moved in a direction indicated by an arrow in FIG. 13 until a lower end of the convex portion 17a abuts with an upper surface of the upper stay 52, whereby the lower end 14a is fitted into the stay-attaching hole 52a. Thereby, the positioning of the stay 11 in the horizontal direction and the depth direction is performed.

Next, wiring paths of the electric cables 31a to 31d will be described. Note that since the wiring paths of the electric cables 31a to 31d are the same, hereinafter, the wiring path of the electric cable 31a will be described as a representative. One end of the electric cable 31a is connector-connected to the drive board 21a of the drive board unit 21 between the stays 11a and 11b. The electric cable 31a is arranged toward the stay 11a through the drive board support plate 21b attached between the stay 11a and the stay 11b. In the stay 11a, the electric cable 31a is arranged along the stay 11a toward the lower side in the vertical direction. As illustrated in FIG. 11, the stay 11a is provided with fasteners 12a and 13a that are arrangement members configured to arrange the electric cable 31a along the stay 11a. The fasteners 12a and 13a are, for example, wiring clamps, and regulate a position of the electric cable 31a within a predetermined range. At the lower end of the stay 11a, the electric cable 31a is arranged in the width direction along the upper stay 52 up to the vicinity of the position in the width direction where the drive unit 1a is provided. Then, the electric cable 31a is connected to the drive unit 1a by crossing the lower side of the flywheel 2a in the depth direction. Note that the position of the electric cable 31a is also regulated by the arrangement member or the like at a place other than the stay 11a. The electric cables 31b to 31d are respectively arranged in the vertical direction along the stays 11b to 11d, and then arranged in the width direction along the upper stay 52, and connected to the drive units 1c to 1d. Note that the arrangement paths of the electric cables 31a to 31d are not limited to those described above. For example, the electric cable 31a may be arranged downward along the stay 11a and then arranged toward the drive unit 1a from the middle of the stay 11a.

As described above, in the present embodiment, the drive board 21a is provided on a front side of the flywheels 2a and 2d when viewed from the back side. Note that the drive board 21a is attached to the stays 11a to 11d through the drive board support plate 21b. In addition, no other member is arranged between the drive board unit 21, including the drive board 21a and the drive board support plate 21b, and the rear surface cover of the first housing 101a. For this reason, the drive board 21a can be visually observed by removing the rear surface cover of the first housing 101a. Then, by releasing the connection between the drive board 21a and the electric cables 31a to 31d and removing the drive board support plate 21b from the stays 11a to 11d, the drive board unit 21 including the drive board 21a and the drive board support plate 21b can be replaced. In addition, by releasing the connection between the drive board 21a and the electric cables 31a to 31d and removing the drive board 21a from the drive board support plate 21b, it is possible to replace the drive board 21a. That is, it is possible to easily perform maintenance work on the drive board 21a.

In addition, as described with reference to FIG. 8, L2 is larger than L1 in the present embodiment. Therefore, by removing the rear surface cover of the first housing 101a, it is possible to access the flywheels 2a and the 2c and the drive units 1a and the 1c, and to perform maintenance work such as visual observation and replacement thereof. Further, by removing the drive board unit 21, it is possible to access the flywheels 2b and 2d and the drive units 1b and 1d, and to perform maintenance work therefor.

In addition, the electric cables 31a to 31d are connector-connected to the drive board 21a through the drive board support plate 21b provided on the back side with respect to the flywheels 2a to 2d. Further, the electric cables 31a to 31d are passed from the drive board support plate 21b to the stays 11a to 11d, arranged in the lower direction along the stays 11a to 11d, arranged in the horizontal direction along the upper stay 52, and connected to the drive units 1a to 1d. Note that in the stays 11a to 11d, the positions of the electric cables 31a to 31d are regulated by the fasteners 12a and 13b of the stays 11a to 11d. With this configuration, it is possible to prevent the electric cables 31a to 31d from coming into contact with the flywheels 2a to 2d and being damaged.

In addition, since the plane of the drive board 21a can be arranged in parallel with the back surface of the image forming apparatus 100 on the back side with respect to the flywheels 2a to 21a, it is possible to effectively utilize a space inside the image forming apparatus 100 and to prevent enlargement of the image forming apparatus 100.

Note that in the present embodiment, the stays 11a to 11d having the same shape are respectively arranged on the left sides of the flywheels 2a to 2d when viewed from the back side, and the two drive board support plates 21b are attached to the two stays adjacent to each other in the width direction, respectively. However, the two stays to which the drive board support plates 21b are attached may not be adjacent to each other in the width direction. For example, it is possible to adopt a configuration in which one drive board support plate 21b is attached bridging the stay 11a and the stay 11c. In this case, for example, one or more drive boards 21a can be attached to the one drive board support plate 21b. On the one or more drive boards 21a, parts configured to supply drive signals to all the drive units are mounted as a whole. Note that the electric cable connecting the drive board 21a of the drive board support plate 21b and the drive unit may be arranged along the stay to which the drive board support plate 21b is attached.

In addition, the number of stays arranged along the width direction is not limited to four, and may be an arbitrary number of two or more. For example, two stays may be arranged along the width direction. In this case, the drive board support plate 21b is arranged bridging the two stays. The drive board support plate 21b is arranged overlapping at least one of the flywheels 2a to 2d when viewed from the back side along the direction opposite to the Y direction. In addition, one or more drive boards 21a configured to supply drive signals to all the drive units 1a to 1d are attached to the drive board support plate 21b. Note that the two stays may be arranged on both sides in the width direction of one of the flywheels 2a to 2d, for example. In this manner, it is possible to adopt a configuration in which two stays are arranged on both sides in the width direction of at least one flywheel of the flywheels 2a to 2d, and the drive board support plate 21b is arranged bridging the two stays.

In addition, in the present embodiment, the two drive board support plates 21b each covering one flywheel when viewed from the back side are provided. However, the number of the drive board support plates 21b is not limited to two, and may be one or more. Similarly, in the present embodiment, one drive board 21a is attached to one drive board support plate 21b, but two or more drive boards 21a may be attached to one drive board support plate 21b. In addition, in the present embodiment, the stays 11a to 11d have the same shape, but each of the shapes of the stays may be different as long as the drive board support plate 21b is attached to the two stays bridging the two stays.

Next, a detailed configuration of the electric unit 51 will be described with reference to FIG. 10. The electric unit 51 includes the upper stay 52 and a lower stay 53 that are made of sheet metal and have an inverted U shape. The upper stay 52 and the lower stay 53 are support members that are attached to the rear side plate 211 and constitute the frame body 301 of the first housing 101a. Further, the electric unit 51 includes a power supply relay board unit 54, an apparatus control board unit 55, and developing high-voltage board units 56 to 59. The power supply relay board unit 54, the apparatus control board unit 55, and the developing high-voltage board units 56 to 59 are also collectively referred to as an electric board unit. These electric board units are attached to the upper stay 52 and the lower stay 53.

The power supply relay board unit 54 includes a power supply relay board support plate 54b that is a board support member, and a power supply relay board 54a attached to the power supply relay board support plate 54b. The power supply relay board support plate 54b is attached to the upper stay 52 and the lower stay 53. The power supply relay board 54a is an electric board, and is connected to the power supply unit of the third housing 101c by a power cable. On the power supply relay board 54a, an electrical part, which is configured to supply operation power to each part of the image forming apparatus based on power from the power supply unit of the third housing 101c, is mounted.

The apparatus control board unit 55 includes an apparatus control board support plate 55b that is a board support member, and an apparatus control board 55a attached to the apparatus control board support plate 55b. The apparatus control board support plate 55b is attached to the upper stay 52 and the lower stay 53. Signal lines configured to transmit and receive signals to and from parts such as a motor, a clutch, and a sensor (not illustrated) in the first housing 101a and signal cables configured to supply power are connected to the apparatus control board 55a. Electrical parts configured to control the parts and the like in the first housing 101a and supply operation power to the parts are mounted on the apparatus control board 55a.

The developing high-voltage board units 56 to 59 are provided to apply a developing voltage to the developing devices 112 of the stations 120 to 123. Hereinafter, the developing high-voltage board units 56 to 59 are collectively referred to as a developing high-voltage board unit 5K (K is an integer of 6 to 9). The developing high-voltage board unit 5K includes a developing high-voltage board support plate 5Kb that is a board support member, and a developing high-voltage board 5Ka attached to the developing high-voltage board support plate 5Kb. The developing high-voltage board support plate 5Kb is attached to the upper stay 52 and the lower stay 53. Parts configured to supply a developing voltage to the developing devices 112 of the stations 120 to 123 are mounted on the developing high-voltage board 5Ka.

The electric unit 51 is constituted by the electric board unit being attached to the upper stay 52 and the lower stay 53. The electric unit 51 is reliably positioned and fixed as a structure in the image forming apparatus 100. Thereby, the positioning of the upper stay 52 forming the structure of the electric unit 51 is performed. Therefore, the positioning of the stays 11a to 11d fixed to the upper stay 52 is performed.

Note that the lower ends 14a of the stays 11a to 11d have only to be fitted into the stay-attaching holes 52a of the upper stay 52, and there is no need to fasten the lower ends 14a of the stays 11a to 11d to the upper stay 52 with screws or the like. This is because the upper portions of the stays 11a to 11d are fastened to the upper common supports 212a to 212c and the upper single support 213 by the screws 215. Since the lower ends 14a of the stays 11a to 11d are not fastened to the upper stay 52, each of the stays 11a to 11d can be removed from the electric unit 51 just by releasing the fastening of the screw 215. With this configuration, access to the electric unit 51, parts that cannot be accessed unless the electric unit 51 is removed, and the like is facilitated, and maintenance work therefor is facilitated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-170033, filed Oct. 24, 2022, which is hereby incorporated by reference herein in its entirety.

What is claimed is:
1. An image forming apparatus comprising:
a plurality of stations arranged along a first direction;
a plurality of stays arranged along the first direction;
a first electric board, on which an electrical part is mounted; and
a first board support member supporting the first electric board, wherein
each of the plurality of stations includes:
 a rotation shaft extending in a second direction intersecting the first direction;
 a photosensitive member configured to rotate together with the rotation shaft;
 a flywheel provided to the rotation shaft; and
 a drive motor configured to rotate the rotation shaft,
each of the plurality of stays extends in a third direction intersecting the first direction and the second direction, the first board support member is attached to two of the plurality of stays so as to bridge a gap between the two of the of the plurality of stays, the first board support member is, in the second direction, provided on a first side of the flywheel, the first side being opposite to a second side of the flywheel on which the photosensitive member is provided, and the first board support member overlaps with the flywheel of at least one of the plurality of stations when viewed from a viewpoint along the second direction.

2. The image forming apparatus according to claim 1, wherein the two of the plurality of stays to which the first board support member is attached are adjacent to each other in the first direction.

3. The image forming apparatus according to claim 2, wherein
the plurality of stations are four stations,
the plurality of stays are four stays,
each of first board support members is attached bridging two stays, of the four stays, adjacent to each other in the first direction, overlapping one of four flywheels of the four stations when viewed from a viewpoint along the second direction, and
electrical parts mounted on first electric boards supported by the two first board support members are each configured to supply drive signals to drive motors of two stations of the four stations.

4. The image forming apparatus according to claim 3, wherein a cable configured to supply the drive signal from the electrical part mounted on the first electric board to the drive motor of one station of the two stations is passed from the first board support member supporting the first electric board to a first stay of the two stays and arranged along the first stay, and a cable configured to supply the drive signal to the drive motor of another station of the two stations is passed from the first board support member supporting the first electric board to a second stay of the two stays different from the first stay and arranged along the second stay.

5. The image forming apparatus according to claim 4, wherein each of the four stays is provided with a member configured to arrange the cable.

6. The image forming apparatus according to claim 1, wherein the electrical part mounted on the first electric board is configured to supply a drive signal to the drive motor of one or more stations of the plurality of stations.

7. The image forming apparatus according to claim 6, wherein a cable configured to supply the drive signal from the electrical part mounted on the first electric board to the drive motor of the one or more stations is passed from the first board support member supporting the first electric board to at least one stay of the two stays, and is arranged along the at least one stay.

8. The image forming apparatus according to claim 7, wherein the at least one stay is provided with a member configured to arrange the cable.

9. The image forming apparatus according to claim 1, further comprising an electric unit including a first support member provided with a plurality of holes respectively fitting to a first end portion of each of the plurality of stays in the third direction, wherein the electric unit and a second end portion of each of the plurality of stays, different from the first end portion of each of the plurality of stays, in the third direction is fixed to a frame body of the image forming apparatus, and the first end portion of each of the plurality of stays is respectively fitted to the plurality of holes of the first support member.

10. The image forming apparatus according to claim 9, wherein
the third direction is a vertical direction, and
the first end portion of each of the plurality of stays is on a side lower than the second end portion of each of the plurality of stays.

11. The image forming apparatus according to claim 9, wherein the plurality of stays are attached to the image forming apparatus by respectively fitting the first end portion of each of the plurality of stays into the plurality of holes of the first support member and then fixing the second end portion of each of the plurality of stays to the frame body of the image forming apparatus.

12. The image forming apparatus according to claim 9, wherein
the electric unit includes
a second support member provided at a position different from the first support member in the third direction,
a plurality of second board support members arranged along the first direction, each of the plurality of second board support members being attached to the first support member and the second support member, and
a second electric board supported by each of the plurality of second board support members, another electrical part being mounted on the second electric board.

13. The image forming apparatus according to claim 12, wherein at least one of a part configured to supply operation power to the image forming apparatus, a part configured to generate a voltage that is used by the image forming apparatus in image formation, and a part configured to control a member of the image forming apparatus is mounted on the second electric board.

14. The image forming apparatus according to claim 1, wherein at least one stay of the plurality of stays includes a region partially overlapping the flywheel when viewed from a viewpoint along the second direction, and a distance in the second direction between the region of the at least one stay and the flywheel is larger than a moving distance in the second direction of the flywheel required to attach and detach the flywheel to and from the image forming apparatus.

15. The image forming apparatus according to claim 1, wherein the drive motor is arranged in the second direction between the photosensitive member in a same station and the flywheel in the same station.

* * * * *